United States Patent [19]

Orcutt

[11] Patent Number: 4,731,685
[45] Date of Patent: Mar. 15, 1988

[54] TRANSDUCING HEAD MOUNTING ON AN UNSUPPORTED LENGTH OF SPRING

[75] Inventor: Frederic K. Orcutt, San Jose, Calif.

[73] Assignee: Ampex Corporation, Redwood City, Calif.

[21] Appl. No.: 787,860

[22] Filed: Oct. 16, 1985

[51] Int. Cl.[4] .......................... G11B 5/55; G11B 21/08
[52] U.S. Cl. ...................................... 360/106; 360/104
[58] Field of Search .................... 360/104, 106, 97, 99, 360/128–129

[56] References Cited

U.S. PATENT DOCUMENTS

| | | | |
|---|---|---|---|
| 2,647,755 | 8/1953 | Townsley | 360/109 |
| 3,022,494 | 2/1962 | Hansen et al. | 360/104 |
| 3,502,820 | 3/1970 | Zenz | 360/109 |
| 3,673,352 | 6/1972 | Wada et al. | 360/104 |
| 3,931,641 | 1/1976 | Watrous | 360/104 |
| 4,071,864 | 1/1978 | Zapala | 360/104 |
| 4,167,766 | 9/1979 | Chau | 360/104 |
| 4,263,630 | 4/1981 | Pierson | 360/104 |
| 4,280,024 | 7/1981 | Dholakia | 369/219 |
| 4,288,824 | 9/1981 | Watanabe | 360/104 X |
| 4,423,449 | 12/1983 | Hasegawa | 360/106 |

OTHER PUBLICATIONS

Rynders et al, "Damped Slides Mount", IBM TDB, Aug. 1968, vol. 11, No. 3, p. 248.

Primary Examiner—Stuart N. Hecker
Assistant Examiner—David J. Severin
Attorney, Agent, or Firm—Harry G. Thibault; Richard P. Lange; Joel D. Talcott

[57] ABSTRACT

To stabilize the transducing head of a magnetic disc memory apparatus, the head is mounted on a flexible leaf aligned transverse to the disc radius; the upstream leaf end is fixed to the head carriage, and the downstream leaf end is restrained against motion normal to the disc surface. The head is secured at a point on the leaf where the tangent to the leaf is always parallel to the disc surface; the head may be balanced on both sides of the leaf; and the leaf may be formed of two parallel members with torsional vibration damping material therebetween.

7 Claims, 6 Drawing Figures

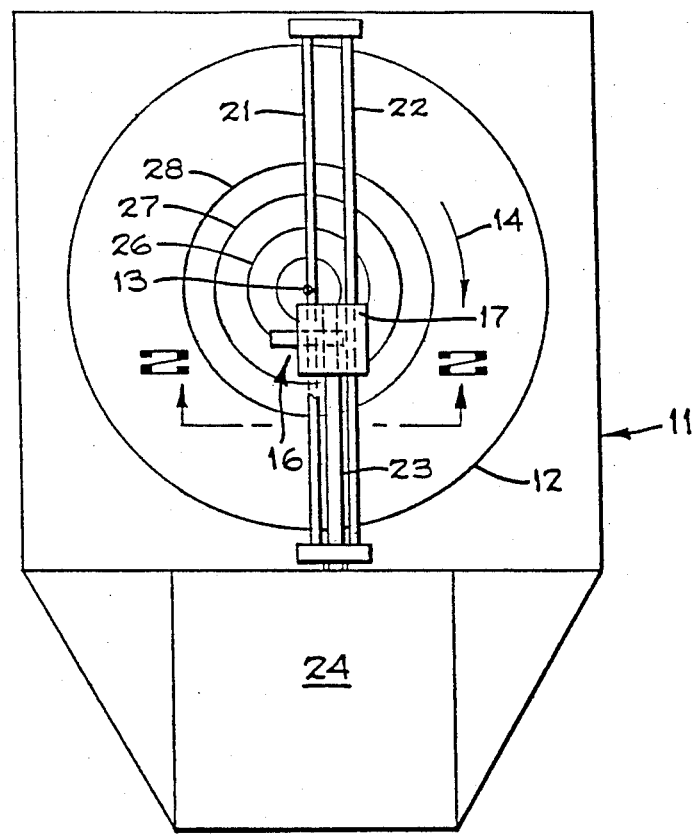
FIG_1
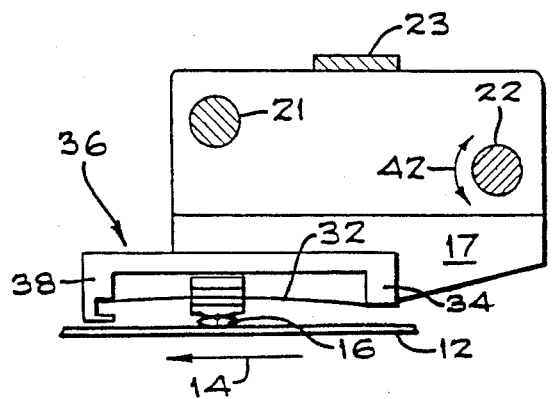
FIG_2

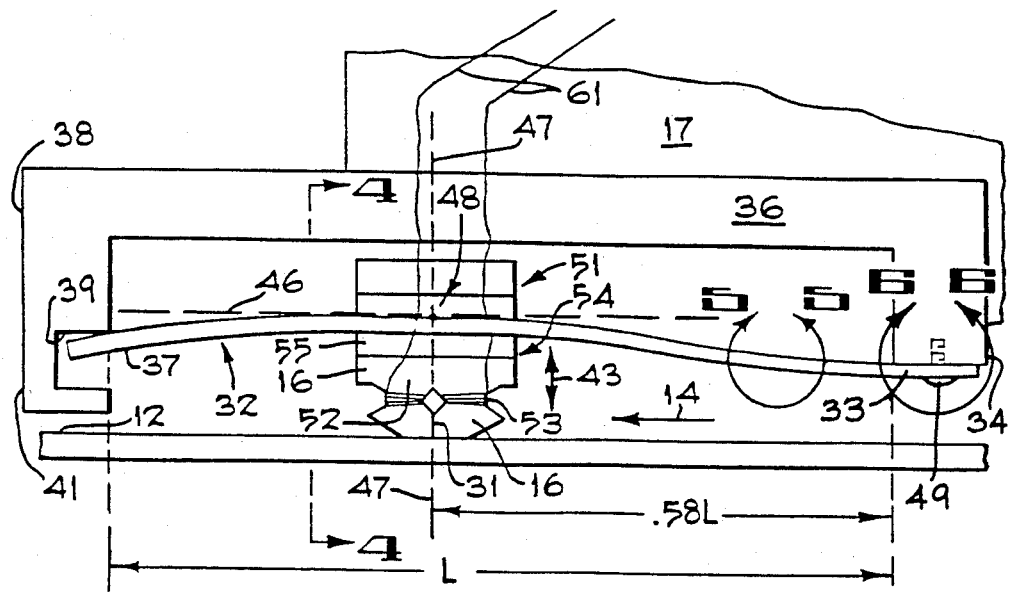
FIG_3
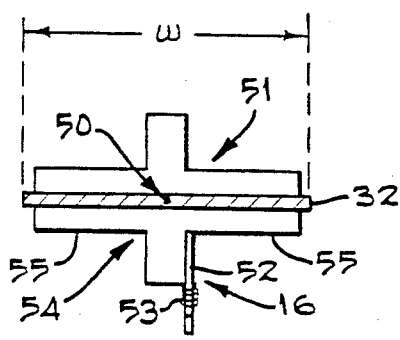
FIG_4
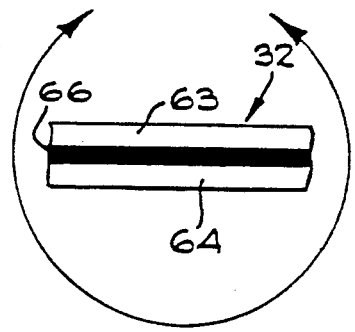
FIG_5
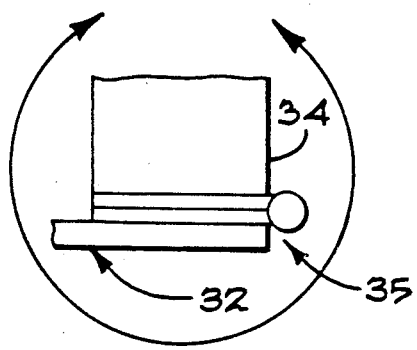
FIG_6

TRANSDUCING HEAD MOUNTING ON AN UNSUPPORTED LENGTH OF SPRING

This invention relates to magnetic transducing machines, and particularly to transducing head mounts in magnetic disc memory machines.

Generally, magnetic disc memory machines include structure for rotating a disc and for causing the transducing head to move radially across the disc, either (1) in a series of discrete radial jumps so as to sweep a set of concentric circular tracks on the disc, or (2) in a steady radial movement so as to describe a spiral track on the disc. In both cases, the process of reading the previously recorded tracks requires the head to jump quickly from track to track to locate a desired block of information at a known radius of the disc. Such sudden jumps often cause the head to be thrown at least temporarily out of its desired perpendicular alignment with respect to the disc and to the tracks recorded thereon, damaging the transducing effectiveness of the machine.

Even during steady-state recording or reproducing modes, it is possible for the head alignment to be disturbed. For example, the head is often mounted at the end of a cantilever spring leaf extending chordally from the head carriage so as to trail the rotating motion of the disc and so as to be spring-loaded against the disc surface for best transducing efficiency. If the disc is warped, it causes the head to move in reciprocating motion up and down, so that the head moves in a back and forth tilting manner, cyclically with each revolution of the disc. The cyclical tilting of the plane of the transducing head gap impairs the close contact of the head gap with the disc surface that is needed for best transducing efficiency. Such a spring leaf also is subject to bending and whipping in a plane parallel to that of the disc when the mass of the head is moved suddenly from track to track, and may also be subject to longcontinuing torsional vibration subsequent to such necessary jumping motion.

Accordingly it is desirable to stabilize a magnetic transducing head with respect to a disc, both in steady-state transducing operation of the head, and during and after discrete track-to-track radial jumping movement of the head.

Such stabilization is attained in the present invention, in which the head is mounted near the mid-portion of a flexible leaf like an arrow being drawn upon a bow. No matter how much the bow (leaf) is flexed, the arrow (transducing head) always points in the same direction, which in the case of the transducing head is the desired direction perpendicular to the disc surface. The head may be balanced on both sides of the leaf so that lateral acceleration of the head and mount does not twist the leaf; and the leaf may be formed of two parallel members with torsional vibration damping material therebetween.

DESCRIPTION OF THE DRAWINGS

FIG. 1 is a schematic plan view of a typical magnetic disc recording machine incorporating the head mount of the invention;

FIG. 2 is an enlarged elevation view of the disc and head mount taken on the plane of lines 2—2 of FIG. 1;

FIG. 3 is an enlarged fragmentary view of a portion of the apparatus shown in FIG. 2;

FIG. 4 is an enlarged cross-sectional view, taken on the plane of lines 4—4 of FIG. 3; and FIG. 5 is an enlarged fragmentary view of that portion of the apparatus enclosed within the lines 5—5 of FIG. 2; and FIG. 6 is an enlarged fragmentary view of that portion of the apparatus enclosed within lines 6—6 of FIG. 2.

DESCRIPTION OF THE PREFERRED EMBODIMENT

Referring now to the drawings and particularly to FIGS. 1-3 thereof, a magnetic disc recording and reproducing machine 11 is shown, upon which is mounted a magnetic disc 12, revolving about a drive spindle 13 in the direction of arrow 14. A magnetic transducing head 16 (better shown in FIGS. 2 and 3) is mounted on a carriage 17 for radial traversing movement on a pair of carriage guide and track rods 21, 22 under the control of a traversing rod 23 extending from an actuator means 24 which may be of the solenoid or linear motor type well known in the art and not here shown in detail. Alternatively, the rod 23 and actuator 24 may be of the screw type, or the head 16 and carriage 17 may be mounted on a pivoting arm and rotated by a rotating solenoid actuator, also of a type well-known in the art, for arcuate but still substantially radial traversing of the rotating disc 12 to follow a set of predetermined tracks on the disc. Such tracks may be of either of two types well-known in the art, i.e. spiral or concentric-circular, such as the tracks 26, 27, 28 shown in FIG. 1.

The mounting of the head 16 is by means of a springy leaf member for spring-loading the head against the disc 12. Usually in the art the head has been mounted at the free end of a cantilevered leaf spring. However, if the disc is warped, or if for some other reason there is variation in the spacing dimension between the carriage and the disc, then the leaf flexes and a tilting of the head with respect to the disc plane occurs. Such a tilting causes the head gap 31 (FIG. 3) portion of the head to be raised from the disc surface and an attentuation of the recorded or reproduced signal results. Even if the tilt is constant, a weaker signal is produced, and if the tilt is variable, an unreliable signal is produced with variations in the signal strength. Only when the plane 47 of the head gap 31 remains continuously orthogonal to the surface of the disc can a satisfactorily uniform signal strength be produced.

In accordance with the present invention, the head 6 is mounted, not at the free end of a cantilevered spring leaf, but like an archer's arrow, near the midpoint of a leaf member 32 (FIG. 3) which extends from a fixed attachment of one leaf end 33 to one arm 34 of a generally U-shaped mounting block 36 that is affixed to the carriage 17. A leaf free end 37 is arranged to bear upwardly against the other arm 38, and particularly against a disc-facing portion 39 of the arm 38. A C-shaped portion 41 of the arm 38 is formed to restrain the leaf free end 37 when the head is raised from the disc, as by pivoting of the block 36 around one of the guide rails 22 (FIG. 2) under the control of the actuator 24, as illustrated by arrow 42. The arm 34 is of course the upstream arm with respect to the direction 14 of the disc motion, so that the head is mounted in a trailing manner with respect to the disc motion.

The purpose of mounting the head 16 at about the mid-section of the spring leaf 32 is to ensure that the plane 47 of head gap 31 remains normal to the plane of the disc, although the head has substantial freedom of motion as by flexing of the leaf in the direction 43 normal to the disc. It will be recognized that the leaf 32, when flexed into an upwardly-convex shape as shown in FIG. 3, always has a tangent or tangential plane 46 that is parallel to the plane of the disc, and the head 16 is affixed to the leaf 32 with its head gap plane 47 passing through the point 48 of tangency of the plane 46 with leaf 32. Thus the plane 47 of the head gap 31 is always substantially normal to the tangent plane 46, and since the plane 46 is by definition parallel to the plane of the disc 12, it follows that the head gap 31 portion of the head is substantially always in close contact (or in constant uniform proximity) to the disc surface.

The precise position of the head 16 along the unsupported length "L" of the leaf 32 depends on the manner in which the base end 33 of the leaf is affixed to the arm 34. The leaf end 33 may be freely pivoted to the arm 34, as by a pivoting attachment 35 connected to the members 32, 34 (FIG. 6), in which case the point 48 of tangency would be at the precise midpoint of the unsupported length "L". However, in such case the pivoting arrangement unavoidably permits a degree of looseness or play in the horizontal position of the head 16 with respect to the carriage 17. If such looseness is great enough to cause objectionable timing errors in the recorded or reproduced signal, then the illustrated arrangement may be used, comprising a fixed attachment of the leaf to the arm 34, as by means of a fastener 49, or alternatively as by means of epoxy cement or other adhesives. However, this attachment method causes the upstream portion of the leaf 32 to adopt an S-shaped configuration that is concave upward near arm 34 and concave downward near head 16, while the downstream portion 37, which is freely slidable on the arm 38, adopts a nearly arcuate conformation that is concave entirely downward. Consequently, the true point of horizontal tangency 48 is not at the precise midpoint of the unsupported length "L", but is slightly offset in a downstream direction. I have determined by empirical experimentation that the point of tangency 48 is located at substantially a distance of 0.58 (L) from the arm 34, and does not vary substantially as the leaf 32 is flexed, at least within the range of flexing motion that may be induced in the illustrated structure.

Having operated the structure thus far described, I found that the leaf 32 and head 16 combination was to a degree subject to a problem that is common to all leaf-spring-mounted heads, whether the head is mounted at the free end of the leaf or otherwise, and whether only one or both ends of the leaf are secured. The problem is torsional flexing and vibration of the leaf, arising when the head is suddenly jumped laterally, as from one track to another during operation, and such vibration often continues for an appreciable time after the jump has ended, resulting in mis-tracking of the head gap 31 in a radial direction of the disc. If a television signal, or any signal that is divided into discrete blocks, is recorded on a disc in concentric circular tracks, then the head-jump from track to track must be made very quickly, as during a blanking interval of the television signal, or during an interval between blocks of the other signal. Consequently, to slow down the jumping motion is neither an efficient, nor even a feasible, solution to the problem.

I have devised two solutions to the torsional vibration problem, which may be used either conjunctively or disjunctively with respect one another or with any leaf-mounting system for the head, including the novel system described above.

One of my solutions is to mount the head mass in balanced or symmetrical relationship, substantially half above and half below the leaf 32, so that lateral horizontal motion of the leaf during the jump does not cause the head mass to pivot about the leaf centerline 50 (FIG. 4), but rather to move bodily in the desired lateral direction with all parts undergoing the same acceleration. In other words, the head is positioned with its center of mass at the centerline 50 of the leaf. If the head cannot be formed symmetrically, then the plane of attachment of the head to the leaf must at least be chosen so that the head mass above the leaf has the same inertial moment about the leaf centerline 50 as does the head mass below the leaf.

In the illustrated embodiment FIGS. 3 and 4, it was not possible to cut the head 16 at any point of its elevation, so a nearly identical counterbalancing member 51 was cemented to the upper face of the leaf 32. The head core 52 and winding 53 of the head 16 are cemented to the downwardly-extending leg of an elongated mounting fixture 54 having a T-shaped crosssection, and the cross-bar portion 55 of the fixture is cemented to the underside of the leaf 32. The fixture 54 has substantial length in the direction of the leaf length, for stability; and the cross-bar 55 of the fixture has substantial width for the same reason. The governing width is of course the width "w" of the leaf (FIG. 4), which must be substantial in order to give the leaf an adequate web dimension to enable it to act as a beam and to stiffen against lateral bending when the leaf and head are moved laterally at high acceleration in a radial direction of the disc.

The magnetic winding leads 61 are extended upwardly and are secured solidly to the block 36 and carriage 17; and the counter-balancing head portion 51, although not precisely identical to the fixture 54 with head 16 attached, is nevertheless carefully constructed to provide an inertial moment about the centerline 50 of the leaf 16 that is equal to that of the fixture 54, head 16, and that portion of the leads 61 that do have an inertial effect as part of the leaf-mounted assembly.

My second solution (FIG. 5) is to form the leaf member 32 as a sandwich of two spring leaves 63 and 64 bracketing a layer 66 of adhesive damping material. In one effective construction, the damping material was ordinary commercial plastic tape of the "two-faced" type, i.e., having pressure-sensitive adhesive on both faces. This structure can be of use even when the head is not counterbalanced on the leaf, for in some applications it can damp out torsional vibrations before the jump interval terminates.

In other applications, both solutions may be needed, for torsional vibrations may arise from causes other than simple lateral jumping motion of the head. In the end, both torsional vibration solutions and the mid-sectional mounting of the head on the leaf have a common objective, which is to ensure stability of the head gap position with respect to the disc in all possible directions, while yet permitting the head in its entirety a bodily freedom of motion in the single direction normal to the disc, so as to be able to follow undulations of the disc surface in close contact or uniform proximity therewith.

Thus there has been described a stabilizing mount for the transducing head of a magnetic disc, the head being mounted near the midpoint of a flexible leaf like an arrow being drawn upon a bow. The leaf is aligned transverse to the disc radius; and the upstream leaf end is fixed to the head carriage and the downstream end bears against the carriage. Since the head is secured near the midpoint of the leaf, at which point the tangent to the leaf is always parallel to the disc, it follows that the head, like the archer's arrow, is always pointed at the target, namely the disc surface to which the head remains perpetually perpendicular, so that good transducing contact between the head gap and the disc is never broken. To avoid torsional vibration of the leaf, the head may be balanced on both sides of the leaf; and the leaf may be formed of two parallel members with torsional vibration-damping material therebetween.

What is claimed is:

1. A head stabilizing mounting structure for the magnetic transducing head of a magnetic disc memory machine of the type in which a head carriage is arranged for generally radial motion with respect to a set of data storage tracks on said disc, comprising:

a generally U-shaped mouning block presenting two generally parallel arms and affixed to the head carriage with the arms extending toward the disc surface and aligned enerally transversely to the disc radius with one arm upstream and the other arm downstream with respect to the direction of disc motion;

a spring leaf member arranged in a plane parallel to the disc surface and secured at one end to the upstream arm and beairng against a disc-facing portion of the downstream arm to define an unsupported length (L) of the leaf member between said arms;

said head being mounted on said unsupported length of said leaf member to define a recording gap between the head and the disc surface and being mounted at a point on the leaf member where the tangent to sid leaf member remains parallel to the disc when the leaf member is flexed into a curvilinear shaped as by movement of said head toward and away from the disc;

said head being urged springily toward said disc but permitted freedom of motion with respect to the head carriage in both directions normal to the disc surface, and maintained with the recording gap thereof in a stabilized plane orthogonal to the disc surface for greater accuracy of reproducing and recording.

2. A structure as described in claim 1, wherein said point is substantially 0.58 (L) from the upstream end of said unsupported length (L).

3. A structure as described in claim 1, wherein said spring leaf member is formed of two parallel spring leaves affixed to an intervening layer of distortable damping material so as to provide said leaf element with greater resistance to torsional vibration.

4. A structure as described in claim 1, wherein said leaf member has substantial width in a radial direction of said disc so as to provide beam web strength for the leaf and stabilizing said head against radial deflection with respect to the head carriage under the extreme acceleration and deceleration forces engendered by the stepping of said head carriage radially from track to track on said disc.

5. A structure as described in claim 4, wherein said head is positioned on said spring leaf with the center of mass of said head lying in the plane of said spring leaf so as to be stabilized against tilting of the head and torsional flexing of the spring under the acceleration and deceleration forces arising from the radial stepping of said head carriage from track to track on said disc.

6. A mounting structure for a magnetic transducing head of the type having a tranducing gap arranged transverse to the scanning direction of the head comprising:

a fork member having two generally parallel leading and trailing fork arms aligned in said scanning direction and extending transversely thereto; and a springy leaf member extending between said fork arms and mounting said head generally in the midportion thereof for reciprocating motion parallel to said fork arms;

said leaf member having an attachment to the leading fork arm said head mounted on a unsupported length of the leaf member, the trailing arm engaging a portion of said unsupported length so as to restrain said leaf member from following said head in said reciprocating movement thereof.

7. A structure as recited in claim 6, wherein said attachment of said leaf member to said leading arm is a pivoting attachment.

* * * * *

UNITED STATES PATENT AND TRADEMARK OFFICE
CERTIFICATE OF CORRECTION

PATENT NO. : 4,731,685

DATED : March 15, 1988

INVENTOR(S) : Fredric K. Orcutt

It is certified that error appears in the above-identified patent and that said Letters Patent is hereby corrected as shown below:

```
Column 1, line 36, after "whipping", insert --forces--;
Column 5, line 21, delete "enerally", insert --generally--;
Column 5, line 37, delete "sid", insert --said--.
```

Signed and Sealed this

Sixth Day of December, 1988

*Attest:*

DONALD J. QUIGG

*Attesting Officer*   *Commissioner of Patents and Trademarks*